United States Patent [19]
Welch

[11] 4,434,513
[45] Mar. 6, 1984

[54] INFANT HEAD PROTECTOR

[75] Inventor: Marilyn L. Welch, Aurora, Colo.

[73] Assignee: Gold, Inc., Denver, Colo.

[21] Appl. No.: 321,245

[22] Filed: Nov. 13, 1981

[51] Int. Cl.³ .................. A42B 1/06; A47C 27/00; B60R 7/00

[52] U.S. Cl. .................................. 2/410; 5/425; 297/219; 224/275

[58] Field of Search .............. 2/410; 5/420, 434, 419, 5/424, 425, 417, 436, 430; 280/47.38, 47.4; 224/29; 297/455, 464, 485, 216, 219

[56] References Cited

U.S. PATENT DOCUMENTS

| | | | |
|---|---|---|---|
| 1,967,067 | 7/1934 | Rightmire | 5/434 |
| 2,366,680 | 1/1945 | Valentine et al. | 297/455 |
| 2,483,223 | 9/1949 | Moss | 297/219 |
| 2,644,173 | 7/1953 | James | 5/425 |
| 3,165,355 | 1/1965 | Hitchcock, Jr. et al. | 297/216 |
| 3,366,294 | 1/1968 | Stephenson | 224/29 |
| 4,173,048 | 11/1979 | Varaney | 5/436 |
| 4,383,713 | 5/1983 | Rostorn | 5/438 |

FOREIGN PATENT DOCUMENTS 1047698 7/1953 France .................. 5/419

Primary Examiner—Doris L. Troutman
Attorney, Agent, or Firm—Horace B. Van Valkenburgh

[57] ABSTRACT

A roll extends around the upper end and along each side of an infant's back. The panel continues beyond the roll as a flap on which the infant sits. The roll is formed by an outer layer enclosing a resilient but compressible material and preferably has a larger diameter from the top of the panel, which may have a curved, convex contour followed by the roll, along each side of the panel to a position corresponding to the shoulders of the infant, and then decreases or tapers to the end of each side of the roll. Both the outer layer of the roll and a front layer of the panel may be quilted fabric layers with a rear layer of the panel being fabric.

15 Claims, 6 Drawing Figures

INFANT HEAD PROTECTOR

This invention relates to a protector for the head of an infant.

BACKGROUND OF THE INVENTION

The head of an infant requires protection at all times. As far as is known, no device has been developed to provide protection for the head of an infant which will protect against the effects of a sudden movement, as by rolling over or moving when lying on a bed or the like, or from impact against an object when the infant is seated in a carrier, such as a stroller, a car seat, or the like, and the infant moves or falls asleep and comes into contact with the side or another part of the carrier. Very young infants often have uncontrolled movements when asleep. Infants of an age from a few weeks to 18 months or two years are more often carried about in strollers and some mothers have utilized towels or blankets to provide padding for the infant, particularly the head of the infant.

The child's chair pad of U.S. Pat. No. 2,782,839 provides padding for the back or rear of the torso, as well as for the body below the waist, but provides no protection for the head. Also, the body cushion of U.S. Pat. No. 3,093,407, although shown for use by an adult but presumably reproducible in proportion for use by a child, provides padding for the back and the rear of the anatomy below the shoulders, but no protection for the head. U.S. Pat. No. 3,366,294 discloses a safety carrier for infants which includes a flexible sheet of cloth or plastic but preferably vinyl plastic and having a first, shorter portion and a second longer portion, around the edges of each of which a padding, such as cotton padding, foam rubber, etc., extends. Each end of each portion of the flexible sheet is arcuate, while a pair of straps are attached in spaced relation to the curved end of the longer portion, extending inwardly for attachment, as by hooks or disconnectable fasteners, to a third strap which extends from the center of the end of the shorter portion. The two portions of the sheet are held in perpendicular relation by the straps, while an infant sits on the shorter portion of the flexible sheet, with legs extending over the padding thereof. The back of the infant is against the longer portion of the flexible sheet, with the neck or the back of the head engaging the end of the padding on the longer portion of the sheet. With such use, the infant is protected against a rearward impetus such as occasioned by an automobile being accelerated suddenly or being struck from behind. However, the padding does not surround the head of an infant and therefore, upon a sudden upward movement of the infant, the padding does not engage the head of the infant. Thus, the only protection for the head of the infant, upon such movement, is through the straps which pass over the shoulders. Also, the padding does not engage the infant's head upon a sudden sideways movement. In the one case, where the infant's neck engages the padding, the straps will engage one side of the neck upon a sideways movement, while when the back of the infant's head rests against the padding, the strap will engage the cheek or side of the head upon a sudden sideways movement.

SUMMARY OF THE INVENTION

The protector for the head of an infant, of this invention, comprises a panel, adapted to be engaged by the back of an infant, and a roll which extends around the upper end of the panel and along each side to surround the head of an infant and to continue past the shoulders and adjacent portions of the torso below the shoulders. The panel continues beyond the roll as a flap on which the infant sits, in order to maintain the protector and particularly the roll in position. The roll is formed by an outer layer enclosing a resilient but compressible material and preferably has a larger diameter from the top of the panel, which may have a curved, convex contour followed by the roll, along each side of the panel to a position corresponding to the shoulders of the infant, and then decreases or tapers to the end of each side of the roll. Both the outer layer of the roll and a front layer of the panel may be quilted fabric layers with a rear layer of the panel being fabric. The panel is formed of opposed fabric layers with resilient, compressible padding between, such as provided by the quilted fabric layer of the panel appears, unexpectedly, to maintain the shape of the protector when not in use. The edges of the outer layer of the roll are stitched together, except at one or both smaller ends and the roll stuffed with a suitable padding which is firm yet compressible, such as polyester fibers. Or, the fibers may be placed on a strip of quilted fabric cut to shape, then the edges of the strip moved over the fibers and the strip edges stitched together. The panel layers are inturned and stitched onto the edges of the roll by stitching which is hidden within the panel, while similar hidden stitching attaches one side and the end or both sides of the flap together, with the opposite edge or end of the flap inturned and attached by stitching from the outside.

THE DRAWING

DESCRIPTION OF THE PREFERRED EMBODIMENT

Figure 1:
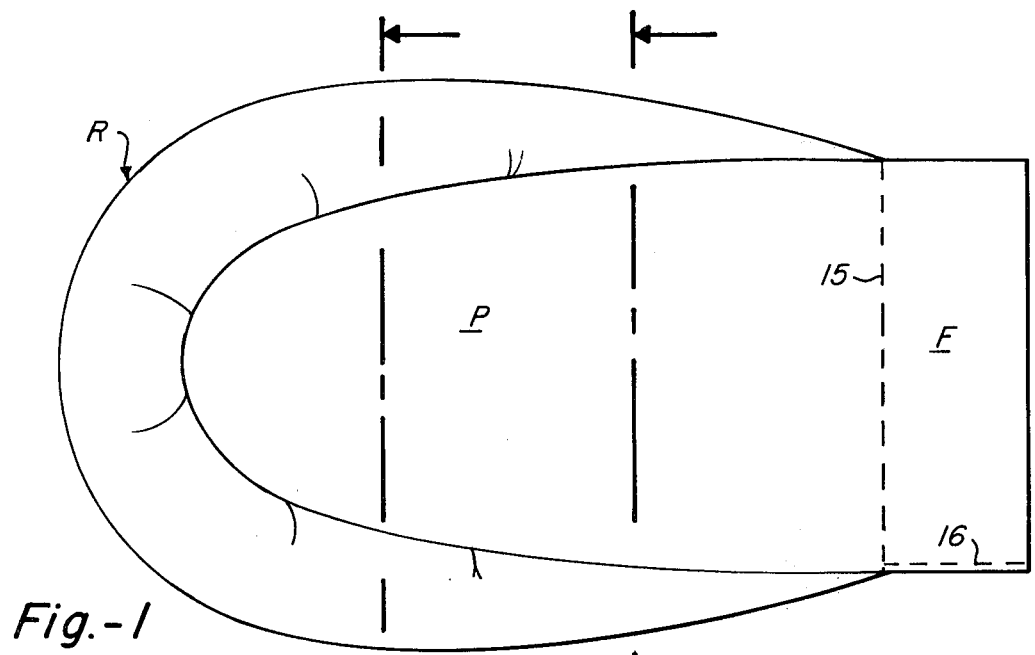
FIG. 1 is a top plan view of an infant head protector of this invention.
Figures 2, 3:
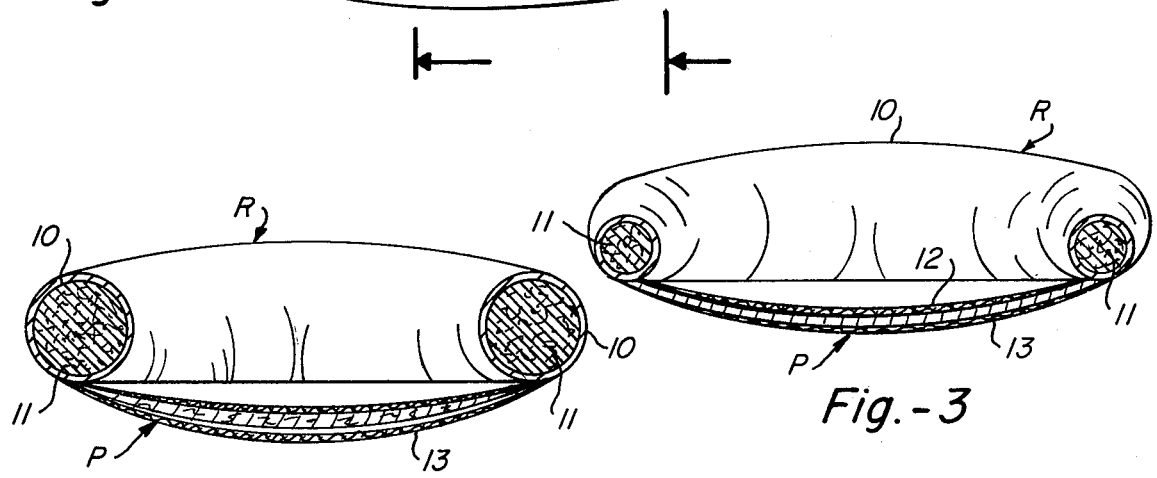
FIG. 2 is a cross section taken along line 2—2 of FIG. 1.
FIG. 3 is a cross section taken along line 3—3 of FIG. 1.

A protector for the head of an infant, constructed in accordance with this invention, as in FIG. 1, may include a roll R which extends around the curved top and sides of a panel P, the latter of which continues below the roll as a flap F, on which the baby sits when sitting upright. The infant may lie on, rest against or otherwise engage the pad P, while the roll R protects the head of the infant. Roll R is constructed from a circular quilted layer 10 which surrounds padding 11, conveniently formed of long polyester fibers which produce a relatively soft but firm resistance to forces against it, thereby terminating movement of an infant's head which may turn, slide or otherwise move against it. The layer 10 for roll R is cut to a shape having parallel sides which extend for a distance corresponding to that from the center of the roll along each side to a point generally opposite the shoulders of an infant, such as corresponding to the position of FIG. 2, then taper to a central point at each end. When initially made, the diameter of roll R is the same from the center to each side for the distance corresponding to the shoulders of the infant. However, when installed, the roll is bent around the curve at the top of panel P, which produces a greater diameter around the curve and a greater amount of padding at the top of the infant's head, which is of advantage if the infant's head should move against the top of roll R. As will be evident, from the position of FIG. 2, the diameter of the roll decreases or tapers past the position of FIG. 3 to the lower end at each side, at which the junction of panel P and flap F is located. As shown in FIG. 1, the lateral dimension of the roll R, at each side, tapers or decreases to a fraction of its lateral dimension at the point at which the taper begins, such as at line 2—2 of FIG. 1. Panel P and flap F may be constructed from a front quilted layer 12 and a rear fabric layer 13, as in FIGS. 2 and 3. Quite unexpectedly, it has been found that the quilted layer 12 of panel P causes the shape of the protector to be maintained. Aside from the conventional diamond stitch pattern on the quilted layers 10 and 12, the only stitching visible from the outside comprises cross stitching 15, at the boundary between the panel P and flap F, and closing stitching 16, along one edge of flap F, although stitching 16 may be located at the end of flap F. As described below, stitching 16 is utilized to close the assembly when turned inside out, after roll R is attached to panel P.

Figure 6:
FIG. 6 is a front elevation on a reduced scale, of a baby stroller in which the infant head protector is utilized.

The protector of FIG. 1 may be placed on a bed, couch or other surface on which the infant is to be placed, or in a car seat or other type of seat, or in a carrier, such as in a manner similar to the placement thereof in a stroller S of FIG. 6. As shown, the head protector may be placed with the flap F on a conventional seat portion of the stroller, so that the head of an infant 19, sitting on the flap F will be within the upper portion of roll R, while the feet of the infant may extend below flap F. A suitable safety belt 20 may be placed around the infant and the sides of roll R, such as adjacent the midsection of the infant. The stroller may include a frame 21 having wheels 22 and a handle 23 for moving and guiding the stroller. As will be evident, if the infant shifts suddenly to one side or the other, the infant's head will engage the roll R, at that side, and thereby avoid damage. If the stroller should be shifted suddenly to either side and, as a result, the infant's head moves in the opposite direction relative to the stroller, the infant's head will again engage the roll R. Also, if the infant suddenly moves upwardly, as by straightening, the top of the infant's head, which may be softer in the center, will engage or impact the upper center portion of roll R, at which the padding has been thickened by placing the roll around a curve.

Figure 4:
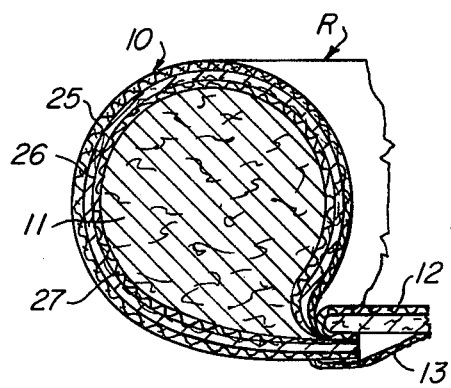
FIG. 4 is an enlargement of a portion of FIG. 2 at the left side thereof, showing particularly a protective roll.
Figure 5:
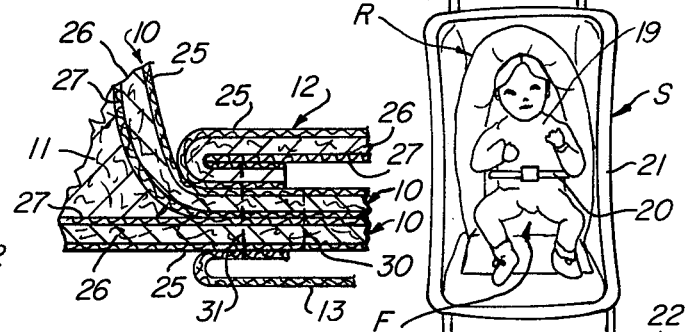
FIG. 5 is a further enlargement of a fragmentary portion of FIG. 4, showing particularly the attachment of the roll of FIG. 4 to a panel of the protector, as well as additional details of the roll and panel.

The quilted layer 10 of the roll R, as well as the quilted layer 12 of the panel P, as in FIGS. 4 and 5, may each include an outer fabric layer 25, an intermediate layer 26 of padding provided by the quilted layer and an inner fabric layer 27. Intermediate layer 26 is formed of a suitable material, such as similar to the padding 11 of polyester fibers, but in a blanket form. Outer woven layer 25 may be decorated with a pattern, as in cheerful colors and appropriate figures, while inner woven layer 27 may be plain white or other color. Rear woven fabric 13 may be in a solid color.

Roll R is conveniently produced by cutting a strip of quilted layer 10 to an appropriate length and having parallel sides to a predetermined position, corresponding generally to the distance from the center around each side adjacent to the infant's shoulders, as at line 2—2 of FIG. 1, then taper to a central point for a further distance to the end of each side of the roll at a point spaced from the opposite end of the panel. The edges of this strip are first secured together, except at one or both ends, by stitching 30 of FIG. 5. The roll is then filled with padding fibers 11 from the respective ends and the ends then closed, or the fibers may be blown into the outer layer of the roll from one end only and that end then closed. Alternatively, appropriate amounts of fibers may be placed on the strip, which is sewn while pulled over the fibers, although the latter procedure will normally require a greater amount of material, because of a greater seam allowance to enable the edges of the strip to be pulled together over the fibers for sewing. Quilted layer 12 and fabric layer 13 may be cut to shape, with allowance for the seam shown in FIGS. 4 and 5, then the edges along one side folded under and placed against the edge of roll R, on opposite sides thereof, such as starting at the end of one side of roll R, as at a point corresponding to closing stitching 16, which is sewn later. When these inturned edges have been sewn onto the edge of roll R to about the midpoint of the roll R, the roll may be reversed to an opposite position, so that the attached edge of the roll will be inside the quilted layer 12 and fabric layer 13 and the unattached edge of the roll on the outside of the roll, rather than on the inside of the roll. In this position, the unattached edges of panel P can be sewn directly onto the previously unattached edge of roll R, while these edges will be inturned after the assembly is later turned inside out. When the opposite end of the roll is reached, the side of flap F opposite the position at which closing stitching 16 will be installed, as well as the bottom edge of flap F, may then be sewn, with the inner edges of layers 12 and 13 on the outside. This leaves only the position of closing stitch 16 open. Or, the edges of both sides of flap F may be sewn together, leaving only the bottom of flap F open, so that closing stitch 16 may be placed at that position. Then, the entire assembly may be turned inside out, through the opening at the position at which closing stitch 16 is to be placed. After this reversal of position, the connection between roll R and panel P will appear as shown in FIGS. 4 and 5. Cross stitch 15 may be placed across the panel P, between the lower ends of roll R, to stabilize the flap F on which the infant may sit. Thus, the edges of the opening through which the assembly has been reversed can then be turned inwardly, in a manner similar to FIGS. 4 and 5, but without the interposition of the edge of roll R. Then, the closing stitching 16 may be applied from the outside.

Although a preferred embodiment of this invention has been illustrated and described, it will be evident that other embodiments may exist and various changes and variations may be made, without departing from the spirit and scope of this invention.

What is claimed is:

1. A protector for surrounding the head of an infant, comprising:
   a panel which an infant may engage;
   a roll attached to and extending around one end and at least a portion of each side of said panel, said one end of said panel being convexly curved and said roll following such curvature of said panel and being constructed and arranged to surround the head of an infant;

said roll being formed of an outer layer surrounding a resilient but compressible material;

said roll extending with a generally similar transverse dimension around said one end and along the sides of said panel to a predetermined position; and the transverse dimension of the sides of said roll decreasing from said predetermined position to a position spaced from the opposite end of said panel.

2. A protector as defined in claim 1, wherein:

the transverse dimension of said roll is greatest along said one end of said panel and slightly less along each side of said panel to said predetermined position.

3. A protector as defined in claim 1, wherein:

the sides of said roll taper from the transverse dimension at said predetermined position to a fraction of such transverse dimension, at the end of each side of said roll.

4. A protector as defined in claim 1, wherein:

said panel extends as a flap past the end of each side of said roll, on which an infant whose torso engages said panel may sit.

5. A protector as defined in claim 1, wherein:

the transverse dimension of said roll is greatest along said one end of said panel and slightly less along each side of said panel to said position which is generally adjacent the shoulders of an infant engaging said panel;

the transverse dimension of the sides of said roll decrease from a position generally adjacent said shoulders of an infant engaging said panel to a minimum at the end of each side of said roll; and said panel extends past the end of each side of said roll as a flap on which said infant may sit.

6. A protector as defined in claim 1, wherein:

the outer layer of said roll is a quilted layer.

7. A protector as defined in claim 1, wherein:

said panel is formed of a front quilted layer and a rear fabric layer.

8. A protector as defined in claim 1, wherein:

the outer layer of said roll is formed at least partially of fabric and the edges thereof are attached by stitching which is disposed on the outside of said roll; and said panel includes at least two fabric layers and the edges of said fabric layers are inturned onto the edges of said roll and attached thereto by stitching which extends through said inturned edges and is disposed inside said panel.

9. A protector as defined in claim 8, wherein:

said panel extends past said roll as a flap;

both sides and the end of said flap are provided with continuations of said inturned edges;

the inturned edges of at least one side of said flap and one of said opposite sides and said end are provided with stitching inside said flap; and the inturned edges of the other of said opposite side and said end are attached by stitching on the outside.

10. A protector as defined in claim 1, wherein:

said roll is formed by cutting material to form a strip having essentially parallel edges for a distance from each side of center to a point corresponding to said predetermined position;

tapering said strip from each end of said parallel edges to positions corresponding to the respective ends of said roll; and enclosing padding material within said strip, including attaching the edges of said strip together.

11. A protector as defined in claim 1, wherein:

said panel includes opposed fabric layers with a padding of resilient but compressible material between said layers.

12. A protector as defined in claim 11, wherein:

said predetermined position is generally adjacent to the position of the shoulders of an infant engaging said panel.

13. A protector for surrounding the head of an infant, comprising:

a panel which an infant may engage and having a convexly curved end;

said panel having opposed fabric layers and resilient but compressible material between said layers;

a roll formed of an outer layer surrounding a resilient but compressible material and attached to said end and a portion of the sides of said panel;

said roll having a convexly curved portion corresponding to said one end of said panel and having sides extending away from said one end, said roll being constructed and arranged to surround the head of an infant;

said sides of said roll having a transverse dimension to a predetermined position spaced from said convexly curved portion greater than the remainder of said sides, over which the transverse dimension of each side decreases to a point spaced from the opposite end of said panel; and the portion of said panel between said ends of said roll and the opposite end of said panel provide a flap on which an infant may sit.

14. A protector as defined in claim 13, wherein:

said resilient but compressible material between said layers of said panel are attached to one of said layers.

15. A protector as defined in claim 13, wherein:

a transverse dimension of said roll is greater along substantially said convexly curved portion than said sides from said convexly curved portion to said predetermined position.

* * * * *